(12) United States Patent
Orizaris et al.

(10) Patent No.: US 6,186,592 B1
(45) Date of Patent: Feb. 13, 2001

(54) HEAT VEHICLE SEAT AND METHOD OF USING SAME

(75) Inventors: Vasillios Orizaris, Renningen; Karl Pfahler, Stuttgart, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/393,701

(22) Filed: Sep. 10, 1999

(30) Foreign Application Priority Data

Sep. 19, 1998 (DE) .............................. 198 42 979

(51) Int. Cl.⁷ .................................................. B60N 2/56
(52) U.S. Cl. ................ 297/180.12; 297/297; 297/180.13
(58) Field of Search ........................ 297/180.12, 180.13, 297/180.14, 180.1; 5/423, 469

(56) References Cited

U.S. PATENT DOCUMENTS

| | | | |
|---|---|---|---|
| 3,136,577 | * | 6/1964 | Richard ........................ 297/180.12 X |
| 5,902,014 | * | 5/1999 | Dinkel et al. ............... 297/180.12 X |
| 5,934,748 | * | 8/1999 | Faust et al. .................. 297/180.13 X |

FOREIGN PATENT DOCUMENTS

| | | |
|---|---|---|
| 196 28 698C1 | 10/1997 | (DE) . |
| 197 03 516C1 | 5/1998 | (DE) . |
| 2561086 | * 9/1985 | (FR) ................................ 297/180.12 |
| 7-24159 | 5/1995 | (JP) . |
| 10-215976 | 8/1998 | (JP) . |
| 10-297275 | 11/1998 | (JP) . |

* cited by examiner

Primary Examiner—Peter R. Brown
(74) Attorney, Agent, or Firm—Evenson, McKeown, Edwards & Lenahan, P.L.L.C.

(57) ABSTRACT

A vehicle seat has a cushion, a seat-heating arrangement integrated in the cushion, a ventilation device for the through-ventilation of the cushion over its surface area, and a control unit for controlling the seat-heating arrangement and ventilation device. For the purpose of shortening the response time of the seat-heating arrangement when the latter is switched on, the control unit activates the ventilation device as the seat-heating arrangement is switched on in each case, the control operation, in the control unit, which causes the seat-heating arrangement to be switched on preferably being such that the seat-heating arrangement and ventilation device are switched on at full power and the power of the ventilation device is reduced asymptotically to a predetermined end value within a predetermined time interval.

18 Claims, 2 Drawing Sheets

HEAT VEHICLE SEAT AND METHOD OF USING SAME

BACKGROUND AND SUMMARY OF THE INVENTION

This application claims the priority of German application 198 42 979.7, filed in Germany on Sep. 19, 1998, the disclosure of which is expressly incorporated by reference herein.

The invention relates to a vehicle seat of the generic type having a seat heating arrangement integrated into a seat cushion, a ventilation device for ventilation of the cushion and a control unit for controlling the heating arrangement and ventilation device.

In the case of a known vehicle seat of this type (German Patent Document DE 196 28 698 C1), the cushion has a ventilation layer which consists of a coarse-meshed knitted spacing fabric, rests on a cushion support consisting of rubberized hair or foam and is covered by an air-permeable pressure-distributing layer. A covering filling consisting of a nonwoven fabric, wool batting or a foam layer of approximately 5–8 mm in thickness is positioned between the pressure-distributing layer and a cushion covering which covers the cushion surface, the cushion covering and covering filling likewise being of air-permeable design. Electric heating wires of the seat-heating arrangement are positioned between the pressure-distributing layer and the covering filling. A arranged in air channels made in the cushion support are miniature fans of the ventilation device which take in air at the underside of the seat and blow it into the ventilation layer. The air spreads out over a large surface area in the ventilation layer and flows out, via the air-permeable cushion layers, at the seat surface and cools the cushion here, which has been heated for example by insolation, to comfortable temperatures. When the seat is occupied, the ventilation of the cushion prevents heat from accumulating in the occupied seat surface and dissipates perspiration moisture from the seat surface.

In the case of a likewise known vehicle with a seat-heating arrangement and seat-ventilation device U.S. Pat. No. 5,934,748 which claims priority to (German Patent Document DE 197 03 516 C1), a control unit is provided in order to achieve considerable temperature-conditioned seat comfort which prevents the seat occupant from perspiring and also from becoming too cold, and said control unit is connected, on the inlet side, to a temperature sensor integrated in the cushion and, on the outlet side, to the electric circuits of the seat-heating arrangement and seat-ventilation device. The control unit controls the switching on and switching off of the seat-heating arrangement and seat-ventilation device, in dependence on the cushion-surface temperature measured by the temperature sensor, in accordance with a predetermined control algorithm.

Such seat-heating arrangements react extremely sluggishly when switched on since the heating elements are located beneath the covering filling or lamination, and in the case of leather seats the heating up is made more difficult by the poor heat conduction of the leather covering. In the winter in particular, a delay in the response time, which may last up to 3 minutes, of the seat-heating arrangement is disadvantageous.

An object of the invention, in the case of a vehicle seat of the type mentioned in the introduction, is significantly to shorten the response times of the seat-heating arrangement when the latter is switched on.

The object is achieved according to the invention by providing an arrangement wherein the control unit at least temporarily activates the ventilation device immediately after the seat-heating arrangement is switched on.

The vehicle seat according to the invention has the advantage that the specific combination of the seat-ventilation device with the seat-heating arrangement in the heating-up phase doubles the heating-up speed of the cushion because, by virtue of the seat-ventilation device being switched on, the ventilation taking place uniformly and over a large surface area, the warm air, which circulates around the heating wires as soon as the seat-heating arrangement has been switched on, is forced to the seat surface.

Advantageous features of preferred embodiments of the vehicle seat according to the invention with expedient configurations and developments of the invention are described herein and in the claims.

According to a preferred embodiment of the invention, the control operation, in the control unit, which causes the seat-heating arrangement to be switched on is such that the seat-heating arrangement and ventilation device are switched on at full power and the power of the ventilation device is reduced asymptotically to a predetermined end value within a predetermined time interval. This co-ordination of the heating and ventilation power achieves an optimum heating-up speed. This means that the end value can be predetermined manually depending on how warm the user is feeling.

Alternatively, according to one embodiment of the invention, the end value is fixed and, when the end value is reached, the control unit controls the seat-heating arrangement and the ventilation device, in dependence on the cushion-surface temperature measured by means of a temperature sensor, in accordance with a predetermined control mode.

Other objects, advantages and novel features of the present invention will become apparent from the following detailed description of the invention when considered in conjunction with the accompanying drawings.

DETAILED DESCRIPTION OF THE DRAWINGS

Figure 1:
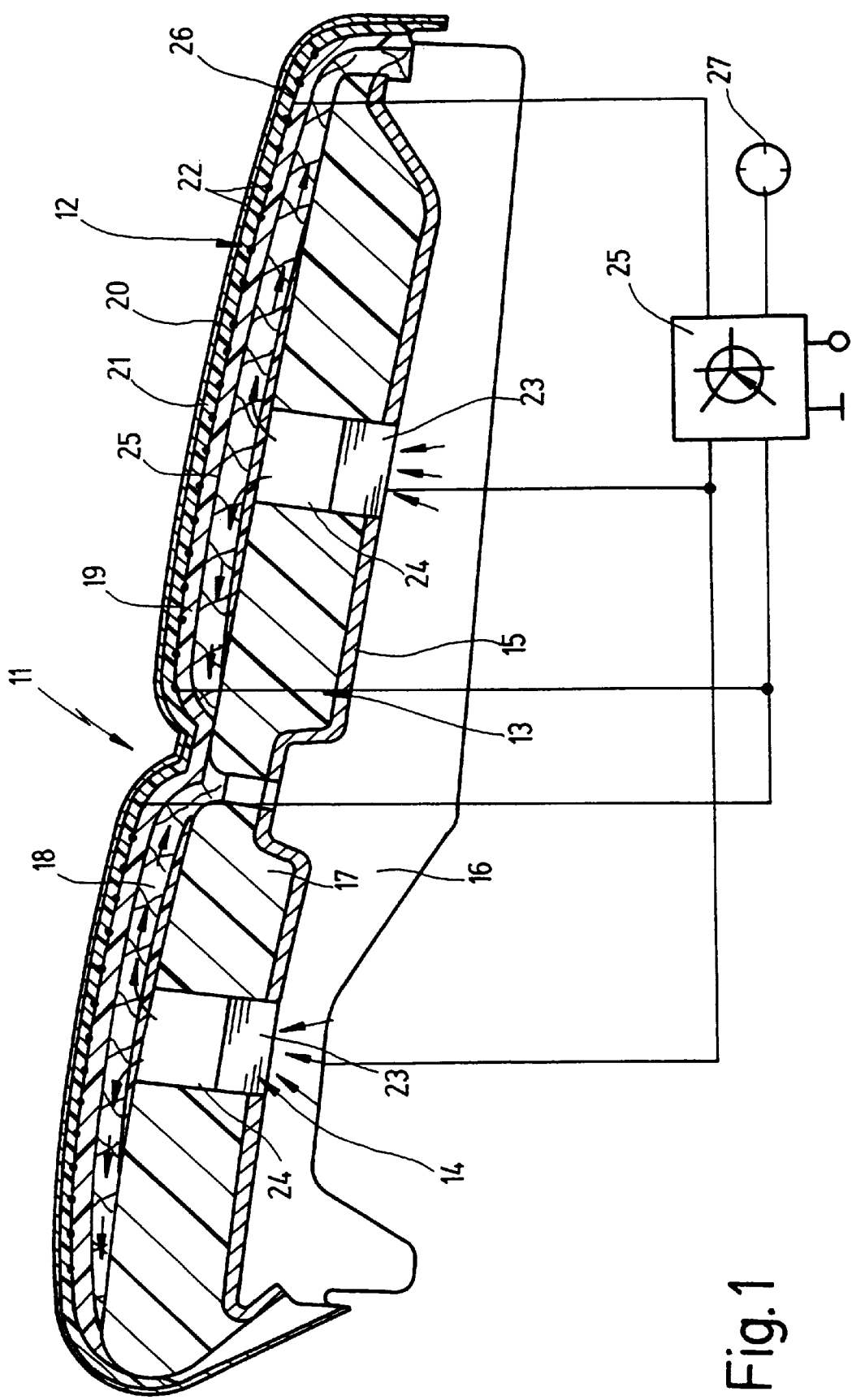
FIG. 1 shows, in a schematic illustration, a longitudinal section of a seat cushion of a vehicle seat, constructed according to a preferred embodiment of the invention.

As is known, a vehicle seat has a seat part 11 (illustrated schematically in FIG. 1), which is retained adjustably on the vehicle base, and a backrest (not illustrated here) which is connected to the seat part 11 via a pivot latching mechanism for the purpose of inclination adjustment. The seat part 11 has a cushion 13, as is illustrated schematically in section in FIG. 1. The cushion of the backrest may be of the same or of a slightly modified construction. The cushion 13 is fastened on a cushion carrier 15, which is designed here as a spring core made of spring wire and is clamped in a frame 16. The cushion 13 comprises a cushion support 17, which rests on the cushion carrier 15 and consists of rubberized hair or foam, a ventilation layer 18, which covers the cushion support 17 over its entire surface area, can have air flowing through it and consists of a coarse-meshed knitted spacing fabric, an air-permeable pressure-distributing layer 19, which rests on the ventilation layer 18 and may consist of a knitted spacing fabric, a nonwoven fabric or an opencell foam, and an air-permeable cushion covering 20 which covers over that surface of the cushion 13 which is directed towards the seat occupant. A covering filling 21 consisting of wool batting or a nonwoven fabric is provided between the cushion covering 20 and pressure-distributing layer 19. Electric heating wires 22 of a seat-heating arrangement 12 are positioned in the covering filling.

Arranged in the cushion support 17 are a plurality of electrically driven miniature ventilators or miniature fans 23 which belong to a ventilation device 14. This ventilation device 14 takes in the air from that region of the vehicle interior which is located beneath the seat part 11 and blows said air into the ventilation layer 18. The miniature fans 23 are arranged in air channels 24 which pass through the cushion support 17 from its bottom end face. The air is directed towards the ventilation layer 18, to the top side of cushion support 17 and is directed away from the ventilation layer 18. The air channels 24 are distributed in the cushion support 17 such that the ventilation layer 18 is through-ventilated over its surface area as uniformly as possible. In the knitted spacing fabric of the ventilation layer 18, the perpendicular cross elements of said fabric being wide-meshed and undirected, the air blown in by the miniature fans 23 can spread out in all directions and can flow through the cushion covering 20 into the air space above the seat surface and thus effect rapid cooling of the cushion surface. When the seat part 11 is occupied, the air passes along the knitted spacing fabric of the ventilation layer 18 and passes out at the open ends of the cushion 13 and at the unoccupied parts of the cushion surface and, in this case, produces an air-humidity gradient, which causes perspiration moisture to be dissipated from the seat surface.

The seat-heating arrangement 12 and the ventilation device 14 are connected to the outlet side of a control unit 25 which is connected, on the inlet side, to a temperature sensor 26 which is arranged in the cushion 13 in the vicinity of the cushion surface. Integrated in the control unit 25 is a temperature-regulator which interacts with a setpoint adjuster 27, which is connected to the control unit 25 on the inlet side, and regulates the temperature of the cushion surface to the setpoint predetermined by the setpoint adjuster 27.

Figure 2:
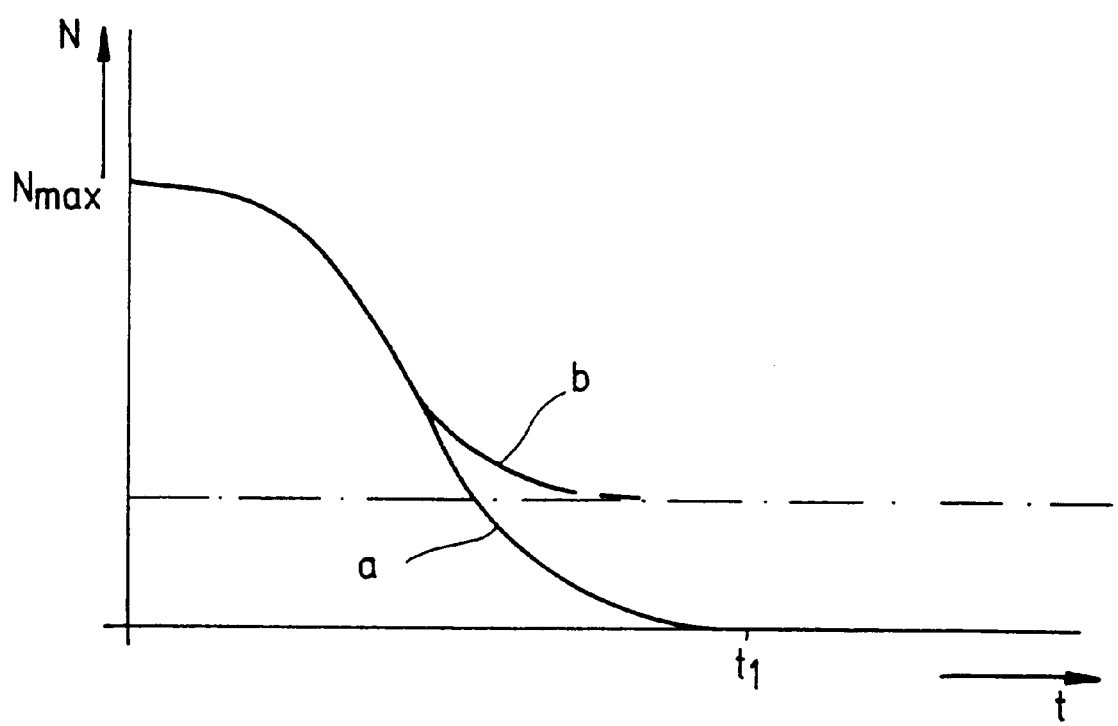
FIG. 2 shows a diagram of the control operation for a control unit which controls the seat-heating arrangement and ventilation device of the seat in FIG. 1.

For rapid heating up of the seat part 11, a control algorithm is predetermined in the control unit 25, and said control algorithm initiates such a control operation, when the seat-heating arrangement is switched on, that the seat-heating arrangement 12 and ventilation device 14 are switched on at full power and the power of the ventilation device 14 is then reduced asymptotically to a predetermined end value within a predetermined time interval. The control curve for the control operation is illustrated in FIG. 2 as a function of the power N of the ventilation device 14 in dependence on the time t. At the point in time t=0, the seat-heating arrangement 12 is switched on, to be precise at maximum power $N_{max}$. The maximum power of the ventilation device 14, that is to say the power of the miniature fans 23, is then lowered asymptotically to an end value within a time interval, which lasts, for example, approximately 2 minutes. In the case of the solid control curve a, this end value is zero. However, it may also be adjusted manually to any other desired end value, depending on how warm the user is feeling. In the dashed control curve b, the end value is fixed and, when the end value is reached, the control unit 25 regulates the seat-heating arrangement 12 and the ventilation device 14, in dependence on the cushion-surface temperature measured by means of the temperature sensor 26, in accordance with a predetermined control mode, as has been described, for example, in U.S. Pat. No. 5,934,748 which claims priority to German Patent Document DE 197 03 516 C1. This control mode may be as follows.

If the cushion-surface temperature is above, for example, 35°, then the ventilation device 14 is switched on or switched over to a higher power stage. If the cushion-surface temperature drops below this value of approximately 35°, then the power of the ventilation device 14 is reduced or switched off altogether.

The invention is not restricted to the above-described exemplary embodiment of a seat part 11 of the vehicle seat. Thus, the backrest of the vehicle seat may be provided with a cushion of similar construction and with the same seat-heating arrangement 12 and ventilation device 14, which are controlled in the same way by the control unit 25.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle seat comprising:
   a cushion,
   a seat-heating arrangement integrated in the cushion,
   a ventilation device for the through-ventilation of the cushion over its surface area, and
   a control unit for controlling the seat-heating arrangement and ventilation device,
   wherein the control unit is automatically operable to initially at least temporarily activate the ventilation device immediately after the seat-heating arrangement is switched on, and to subsequently reduce a power to the ventilation device within a predetermined time interval, whereby the vehicle seat is initially rapidly heated after the heating arrangement is switched on due to the combined operation of the seat-heating arrangement and the ventilation device.

2. Vehicle seat according to claim 1, wherein the control unit is operable to cause the seat-heating arrangement to be switched on such that the seat-heating arrangement and ventilation device are switched on at full power and the power of the ventilation device is reduced asymptotically to a predetermined end value within the predetermined time interval.

3. Vehicle seat according to claim 2, wherein the end value can be adjusted manually.

4. Vehicle seat according to claim 3, wherein the end value is zero.

5. Vehicle seat according to claim 2, wherein the end value is fixed and, when the end value is reached, the control unit controls the seat-heating arrangement and the ventilation device, in dependence on the cushion-surface temperature measured by means of a temperature sensor, in accordance with a predetermined control mode.

6. A vehicle seat assembly comprising:
   a seat heater integrated in a seat cushion of the vehicle seat assembly,
   a seat ventilator integrated in the seat cushion, and
   a control unit operatively connected to the seat heater and the seat ventilator and is automatically operable to initially temporarily activate the seat ventilator when the seat heater is switched on and to subsequently reduce a power to the ventilation device within a predetermined time interval, whereby the vehicle seat is initially rapidly heated after the heating arrangement is switched on due to the combined operation of the seat-heating arrangement and the ventilation device.

7. An assembly according to claim 6, wherein the seat heater is an electric resistance wire heater embedded in the seat cushion, and wherein the seat ventilator is operable to circulate air around the heater and through the seat cushion.

8. An assembly according to claim 6, wherein the control unit is operable to switch the seat ventilator on at full power when the seat heater is switched on.

9. An assembly according to claim 8, wherein the control unit is operable to reduce power of the seat ventilator asymptotically to a predetermined end value within the predetermined time interval after the seat heater is switched on.

10. An assembly according to claim 9, wherein the end value can be adjusted manually.

11. An assembly according to claim 9, wherein the end value is zero.

12. An assembly according to claim 9, wherein the end value is fixed and, when the end value is reached, the control unit controls the seat-heating arrangement and the ventilation device, in dependence on the cushion-surface temperature measured by means of a temperature sensor, in accordance with a predetermined control mode.

13. A method of heating a vehicle seat assembly of the type having a seat heater integrated in a seat cushion of the vehicle seat assembly, a seat ventilator integrated in the seat cushion, and a control unit operatively connected to the seat heater and the seat ventilator and operable to control the seat heater and seat ventilator, said method comprising:

providing the control unit to automatically temporarily activate the seat ventilator when the seat heater is switched on; and the control unit operating to reduce a power to the ventilation device within a predetermined time interval, whereby the vehicle seat is initially rapidly heated after the heating arrangement is switched on due to the combined operation of the seat-heating arrangement and the ventilation device.

14. A method according to claim 13, wherein the seat heater is an electric resistance wire heater embedded in the seat cushion, and wherein the seat ventilator is operable to circulate air around the heater and through the seat cushion.

15. A method according to claim 14, wherein the seat ventilator is switched on at full power when the seat heater is switched on.

16. A method according to claim 14, wherein the control unit is operable to reduce power of the seat ventilator asymptotically to a predetermined end value within the predetermined time interval after the seat heater is switched on.

17. A method according to claim 16, wherein the end value can be adjusted manually.

18. A method according to claim 16, wherein the end value is zero.

* * * * *